US011042068B2

(12) United States Patent
Xu et al.

(10) Patent No.: US 11,042,068 B2
(45) Date of Patent: Jun. 22, 2021

(54) DISPLAY SUBSTRATE AND MANUFACTURING METHOD THEREOF, DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhicai Xu, Beijing (CN); Wu Wang, Beijing (CN); Xiaoyuan Wang, Beijing (CN); Kui Zhang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 422 days.

(21) Appl. No.: 15/777,031

(22) PCT Filed: Oct. 20, 2017

(86) PCT No.: PCT/CN2017/107057
§ 371 (c)(1),
(2) Date: May 17, 2018

(87) PCT Pub. No.: WO2018/188301
PCT Pub. Date: Oct. 18, 2018

(65) Prior Publication Data

US 2020/0292893 A1 Sep. 17, 2020

(30) Foreign Application Priority Data

Apr. 11, 2017 (CN) ........................ 201710233459.X

(51) Int. Cl.
*G02F 1/1362* (2006.01)
*G02F 1/1335* (2006.01)
*G02F 1/1343* (2006.01)

(52) U.S. Cl.
CPC .. *G02F 1/136286* (2013.01); *G02F 1/133514* (2013.01); *G02F 1/133553* (2013.01);
(Continued)

(58) Field of Classification Search
CPC ................................................ G02F 1/136286
See application file for complete search history.

(56) References Cited

U.S. PATENT DOCUMENTS

2002/0191138 A1* 12/2002 Matsumoto ....... G02F 1/134363 349/141
2003/0184699 A1* 10/2003 Matsumoto ....... G02F 1/134363 349/141
(Continued)

FOREIGN PATENT DOCUMENTS

CN 102629041 A 8/2012
CN 103293811 A 9/2013
(Continued)

OTHER PUBLICATIONS

The First Chinese Office Action dated Apr. 1, 2019; Appln. No. 201710233459.X.
(Continued)

*Primary Examiner* — Edmond C Lau

(57) ABSTRACT

A display substrate and a manufacturing method thereof, and a display device are provided. The display substrate includes a base substrate, a plurality of pixel groups located on the base substrate and a first shading portion located between the plurality of pixel groups and the base substrate. Each of the plurality of pixel groups includes two pixel units, each of the plurality of pixel groups includes two opaque first
(Continued)

~2120 common electrode strips and a second common electrode strip located between the two opaque first common electrode strips, an orthogonal projection of a space between the two opaque first common electrode strips on the base substrate falls within an orthogonal projection of the first shading portion on the base substrate.

16 Claims, 5 Drawing Sheets

(52) U.S. Cl.
CPC .. *G02F 1/134309* (2013.01); *G02F 2201/121* (2013.01); *G02F 2201/123* (2013.01)

(56) References Cited

U.S. PATENT DOCUMENTS

| | | | | |
|---|---|---|---|---|
| 2009/0109356 | A1* | 4/2009 | Kitagawa .......... | G02F 1/134363 349/33 |
| 2014/0022475 | A1 | 1/2014 | Gotoh et al. | |
| 2014/0063382 | A1 | 3/2014 | Wu | |
| 2014/0347582 | A1 | 11/2014 | Murao et al. | |
| 2014/0353690 | A1 | 12/2014 | Choi et al. | |
| 2016/0035118 | A1 | 3/2016 | Lee | |
| 2016/0080731 | A1 | 3/2016 | Niu et al. | |

FOREIGN PATENT DOCUMENTS

| | | | |
|---|---|---|---|
| CN | 103869488 | A | 6/2014 |
| CN | 104216129 | A | 12/2014 |
| CN | 104730763 | A | 6/2015 |
| CN | 106959557 | A | 7/2017 |
| JP | 0996777 | A | 4/1997 |
| JP | 2003-295117 | A | 10/2003 |

OTHER PUBLICATIONS

International Search Report and Written Opinion dated Jan. 18, 2018; PCT/CN2017/107057.

* cited by examiner

DISPLAY SUBSTRATE AND MANUFACTURING METHOD THEREOF, DISPLAY DEVICE

The present application claims priority of China Patent application No. 201710233459.X filed on Apr. 11, 2017, the content of which is incorporated in its entirety as portion of the present application by reference herein.

TECHNICAL FIELD

At least one embodiment of the present disclosure relates to a display substrate and a manufacturing method thereof, and a display device.

BACKGROUND

A naked-eye three-dimensional (3D) display means that a left eye image and a right eye image enter the use's left eye and right eye respectively through different light paths without using special glasses, the two images are slightly different, and finally a 3D image is formed in a brain of the user. Compared with ordinary two-dimensional (2D) display, the naked-eye 3D display has advantages of three-dimensional reality and being able to make audience immersive, which makes the study of the naked-eye 3D display has important significance.

The current naked-eye 3D technology mainly includes: a light barrier type 3D display technology, a lenticular lens type 3D display technology, and a directional light source type 3D display technology. The light barrier type 3D display technology mainly uses a barrier to control the light path, thereby achieving 3D display; the lenticular lens type 3D display technology uses lenticular lenses to control the optical path by refraction so as to achieve 3D display; the directional light source type 3D display technology controls the light path through a backlight source, thereby achieving 3D display.

SUMMARY

At least one embodiment of the present disclosure provides a display substrate and a manufacturing method thereof, and a display device. In the display substrate, the light for a left-eye image displayed by pixel groups is transmitted to a left eye of the user, and the light for a right-eye image displayed by the pixel groups is transmitted to a right eye of the user through a combined influence of first common electrode strips and a first shading portion, thereby achieving the naked-eye three-dimensional (3D) display effect.

At least one embodiment of the present disclosure provides a display substrate, the display substrate includes a base substrate, a plurality of pixel groups located on the base substrate and a first shading portion located between the plurality of pixel groups and the base substrate. Each of the plurality of pixel groups includes a common electrode, the common electrode includes two opaque first common electrode strips extending in a first direction, and a second common electrode strip located between the two opaque first common electrode strips; the first shading portion extends in the first direction, and an orthogonal projection of a space between the two opaque first common electrode strips on the base substrate falls within an orthogonal projection of the first shading portion on the base substrate.

For example, in a direction from close to the second common electrode strip to away from the second common electrode strip, a vertical distance from the two opaque first common electrode strips to the base substrate gradually decreases, and a side of the two opaque first common electrode strips facing the base substrate is a reflective surface.

For example, the plurality of pixel groups include: an interlayer dielectric layer, located on the first shading portion, a section of the interlayer dielectric layer is a trapezium, the two opaque first common electrode strips are respectively located on two waists of the trapezium.

For example, the interlayer dielectric layer comprises a color filter layer.

For example, a ratio of a sum of sizes of the two opaque first common electrode strips in a second direction perpendicular to the first direction to a size of the plurality of pixel groups in the second direction is in a range of 40% to 60%, and the second direction is parallel to the base substrate.

For example, the display substrate further includes a data line, extending in the first direction, and there is a space between the data line and the first shading portion in a second direction perpendicular to the first direction, wherein in a direction perpendicular to the base substrate, an edge of the data line close to the first shading portion is aligned with an edge of the two opaque first common electrode strips away from the second common electrode strip or the data line overlaps with the two opaque first common electrode strips, the second direction is parallel to the base substrate.

For example, the first shading portion is on a same layer as the data line.

For example, the display substrate further includes a gate line extending in the second direction, and the first shading portion is on a same layer as the gate line.

For example, the display substrate further includes: a second shading portion, disposed on a same layer as the data line, and an orthogonal projection of the second shading portion on the base substrate falls within the orthogonal projection of the first shading portion on the base substrate.

For example, a material of the first shading portion and a material of the second shading portion include a conductive material, and the first shading portion is electrically connected to the second shading portion, the first shading portion is electrically connected to the common electrode.

For example, each of the plurality of pixel groups further includes a pixel electrode disposed in a same layer as the common electrode, the pixel electrode is located between the two opaque first common electrode strips and the second common electrode strip.

For example, the two pixel units of each of the plurality of pixel groups are symmetrically distributed with respect to a centerline of the second common electrode along the first direction.

At least one embodiment of the present disclosure provides a manufacturing method of a display substrate, the manufacturing method of the display substrate includes: forming a first shading portion extending in a first direction on a base substrate; forming a plurality of pixel groups on a side of the first shading portion away from the base substrate, each of the plurality of pixel groups includes two pixel units, each of the plurality of pixel groups includes a common electrode, the common electrode includes two opaque first common electrode strips extending in the first direction, and a second common electrode strip located between the two opaque first common electrode strips, wherein an orthogonal projection of a space between the two opaque first common electrode strips on the base substrate falls within an orthogonal projection of the first shading portion on the base substrate.

For example, forming the plurality of pixel groups includes: forming an interlayer dielectric layer with a sectional shape of trapezium on the first shading portion, wherein the two opaque first common electrode strips are respectively formed on two waists of the trapezium.

For example, the manufacturing method of the display substrate further includes: forming a second shading portion on the first shading portion so that an orthogonal projection of the second shading portion on the base substrate falls within the orthogonal projection of the first shading portion on the base substrate.

At least one embodiment of the present disclosure provides a display device, which includes the display substrate provided by any embodiment of the present disclosure.

BRIEF DESCRIPTION OF THE DRAWINGS

In order to clearly illustrate the technical solution of embodiments of the present disclosure, the drawings of the embodiments or related technical description will be briefly described in the following, it is obvious that the drawings in the description are only related to some embodiments of the present disclosure and not limited to the present disclosure.

DETAILED DESCRIPTION

Figure 1A:
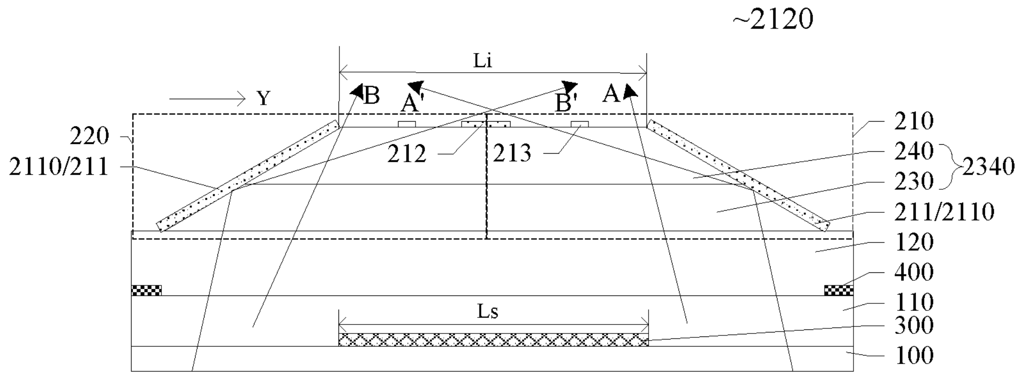
FIG. 1*a* is a sectional view of a display substrate provided by an embodiment of the present disclosure.

In order to make objects, technical details and advantages of the embodiments of the present disclosure apparent, the technical solutions of the embodiments of the present disclosure will be described in a clearly and fully understandable way in connection with the drawings related to the embodiments of the disclosure. It is obvious that the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

In a study, the inventors of the present application have found that achieving a naked-eye 3D display based on a thin film transistor-liquid crystal display (TFT-LCD) can reduce retrofit cost of the TFT-LCD production line and can reduce price of the naked-eye 3D display.

Embodiments of the present disclosure provide a display substrate and a manufacturing method thereof, and a display device. The display substrate includes a base substrate, a plurality of pixel groups located on the base substrate and a first shading portion located between the pixel groups and the base substrate. Each of the pixel groups includes two pixel units, each of the pixel groups includes a common electrode, the common electrode includes two opaque first common electrode strips extending in a first direction, and a second common electrode strip located between the two opaque first common electrode strips; the first shading portion extends in the first direction, and an orthogonal projection of a space between the two opaque first common electrode strips on the base substrate falls within an orthogonal projection of the first shading portion on the base substrate. In the display substrate, the light for a left-eye image displayed by the pixel groups is transmitted to a left eye of the user, and the light for a right-eye image displayed by the pixel groups is transmitted to a right eye of the user through a combined influence of the first common electrode strips and the first shading portion, thereby achieving the naked-eye three-dimensional (3D) display effect.

Hereafter, a display substrate and a manufacturing method thereof, and a display device provided by embodiments of the present disclosure are described with reference to the drawings.

First Embodiment

The present embodiment provides a display substrate, as illustrated in FIG. 1*a*, the display substrate includes a base substrate 100, a plurality of pixel groups 2120 located on the base substrate 100 and a first shading portion 300 located between the pixel groups 2120 and the base substrate 100. In FIG. 1*a*, a case that one pixel group 2120 is disposed on the base substrate 100 is only exemplary, and a plurality of pixel groups 2120 can be disposed on the base substrate 100. The present disclosure takes an example that the display substrate is an array substrate for description, and the present embodiment is not limited thereto.

As illustrated in FIG. 1*a*, the pixel group 2120 includes two pixel units 210 and 220, the two pixel units 210 and 220 are configured to display a left eye image and a right eye image respectively. The pixel group 2120 composed of the pixel units 210 and 220 includes a common electrode 2110, the common electrode 2110 includes two opaque first common electrode strips 211 extending in a first direction, and a second common electrode strip 212 located between the two opaque first common electrode strips 211. It should be noted that, the two pixel units 210 and 220 here have one first common electrode strip 211 respectively, and share one second common electrode strip 212. The two opaque first common electrode strips 211 play a role of shading. The first direction is a direction perpendicular to the paper, Y direction illustrated in FIG. 1*a* is a second direction, and the present embodiment is not limited thereto.

As illustrated in FIG. 1*a*, the first shading portion 300 extends in the first direction, and a size Ls of the first shading portion 300 in the Y direction is not less than a space Li between the two first common electrode strips 211.

For example, an orthogonal projection of the space Li between the two first common electrode strips 211 on the base substrate 100 falls within an orthogonal projection of the first shading portion 300 on the base substrate 100, that is, in a direction perpendicular to the base substrate 100, an edge of the first common electrode strips 211 close to the second common electrode strip 212 can be aligned with an edge of the first shading portion 300 close to the first common electrode strips 211, or the first common electrode strips 211 overlap with the first shading portion 300, a size of an overlap in the Y direction is less than 2 μm, the present embodiment includes but is not limited thereto. It should be noted that, the size of the overlap cannot be too large to affect the normal display.

For example, it is known from a relationship between the first common electrode strips 211 and the first shading portion 300, light incident from the side of the base substrate 100 facing away from the first shading portion 300 cannot exit from the display substrate in the direction perpendicular to the base substrate 100, that is, the first common electrode strips 211 provided by the present disclosure have a wider width, and the first common electrode strips 211 can cooperate with the first shading portion 300 to form a barrier, so that the light can only be emitted in a fixed direction under the function of the barrier, so as to achieve the purpose of controlling the light path.

For example, as illustrated in FIG. 1*a*, the light for the left-eye image displayed by the pixel group 2120 is transmitted to the left eye of the user, and the light for the right-eye image displayed by the pixel group 2120 is transmitted to the right eye of the user through a combined influence of the first common electrode strips 211 and the first shading portion 300.

For example, as illustrated in FIG. 1*a*, the light incident from the side of the base substrate 100 facing away from the first shading portion 300 is divided into two parts by the first shading portion 300, that is, the light incident on the base substrate 100 from a backlight (not illustrated in FIG. 1*a*) can enter the display substrate only through the right and left sides of the first shading portion 300 in the Y direction, and then a light path of the light is changed by the two opaque first common electrode strips 211 of the pixel group 2120 on both sides of the Y direction so as to be emitted to the left and right eyes of the user respectively.

For example, emergent light A incident from the right side of the first shading portion 300 in the Y direction passes through the first pixel unit 210 and emits to the left (right) eye of the user, emergent light B incident from the left side of the first shading portion 300 in the Y direction passes through the second pixel unit 220 and emits to the right (left) eye of the user, because the first pixel unit 210 and the second pixel unit 220 respectively display the left image and the right image, and the image of each of the pixel units can only enter one corresponding eye of the user and cannot enter the other eye, therefore the image interference can be prevented so as to achieve the naked-eye 3D display.

For example, as illustrated in FIG. 1*a*, the pixel group 2120 further includes pixel electrodes 213 disposed on the same layer as the common electrode 2110, the pixel electrodes 213 are located between the first common electrode strips 211 and the second common electrode strip 212 respectively. It should be noted that, the display substrate provided by the present embodiment is an in-plane switching (IPS) display mode, for example, the display mode can be an advanced-super dimensional switching (ADS) mode, a fringe field switching (FFS) mode and so on.

For example, a material of the pixel electrodes can be transparent conductive material, for example, the transparent conductive material can include at least one selected from the group consisting of indium tin oxide (ITO), indium zinc oxide (IZO), zinc oxide (ZnO), indium oxide ($In_2O_3$), and indium gallium oxide (IGO), the present embodiment is not limited thereto.

For example, the material of the pixel electrodes can also be the same as that of the common electrode, so that the pixel electrodes and the common electrode can be made in one patterning process so as to save the process.

For example, as illustrated in FIG. 1*a*, in a direction from an edge of the first common electrode strips 211 close to the second common electrode strip 212 to an edge of the first common electrode strips 211 away from the second common electrode strip 212, a vertical distance from the first common electrode strips 211 to the base substrate 100 gradually decreases, that is, a plane where the first common electrode strips 211 is located has an inclination angle with respect to a plane where the base substrate 100 is located.

For example, as illustrated in FIG. 1*a*, an inclination angle (acute angle) between a plane where a first common electrode strip 211 in the first pixel unit 210 is located and the plane where the base substrate 100 is located is the same as an inclination angle (acute angle) between a plane where a first common electrode strip 211 in the second pixel unit 220 is located and the plane where the base substrate 100 is located, and the present embodiment includes but is not limited thereto.

For example, as illustrated in FIG. 1*a*, a side of the first common electrode strips 211 facing the base substrate 100 is a reflective surface, emergent light A' incident from the right side of the first shading portion 300 in the Y direction is reflected by the first common electrode strip 211 in the first pixel unit 210 and emits to the left (right) eye of the user, emergent light B' incident from the left side of the first shading portion 300 in the Y direction is reflected by the first common electrode strip 211 in the second pixel unit 220 and emits to the right (left) eye of the user. Because the first common electrode strips 211 further play a role of reflection, more light can be reflected by the first common electrode strips 211 and be emitted from the pixel group 2120 to increase the transmittance of the display substrate. On the other hand, the emergent light A'(B') and the emergent light A(B) are not in one direction, the inclination design of the first common electrode strips 221 can also increase the viewing angle of the display substrate. The design structure of the display substrate provided by the present embodiment can be compatible with a general TFT-LCD to achieve the naked-eye 3D display and a purpose of reducing the cost of transforming the TFT-LCD production line on the basis of the TET-LCD.

For example, the first common electrode strips 211 are not limited to the inclination design, as long as the light incident from the side of the base substrate 100 facing away from the first shading portion 300 cannot be emitted from the display substrate in the direction perpendicular to the base substrate 100.

For example, the first common electrode strips 211 can be made of one or more materials selected from the group consisting of titanium (Ti), platinum (Pt), gold (Au), chromium (Cr) and so on, but the present embodiment is not limited thereto.

For example, the second common electrode strip 212 can be made of the same opaque conductive material as the first common electrode strips 211 so as to limit the emergent light A' (B') and the emergent light A(B), but the present embodiment includes and is not limited thereto.

For example, as illustrated in FIG. 1*a*, the pixel group 2120 further includes an interlayer dielectric layer 2340, and the interlayer dielectric layer 2340 is located on the first shading portion 300. For example, a sectional shape of the interlayer dielectric layer 2340 is a trapezium, the two opaque first common electrode strips 211 are respectively located on two waists of the trapezium so as to achieve the inclination design, and the present includes but is not limited thereto.

For example, the sectional shape of the interlayer dielectric layer 2340 is an isosceles trapezium, so that the two first common electrode strips 211 have the same inclination angle with the base substrate, and the present embodiment includes but is not limited thereto.

For example, the interlayer dielectric layer 2340 includes a color filter film 230 (non-resin material) and a resin layer 240, a sectional shape of at least one of the color filter layer 230 and the resin layer 240 is a trapezium, and the present embodiment takes an example that the sectional shapes of the color filter layer 230 and the resin layer 240 are both trapeziums for description. The present embodiment includes but is not limited thereto, for example, the interlayer dielectric layer can further include other layers.

For example, a ratio of a sum of sizes of the two opaque first common electrode strips 211 in a second direction perpendicular to the first direction, that is the Y direction to a size of the pixel group 2120 in the Y direction is in a range of 40% to 60%.

For example, the ratio of the sum of the sizes of the two first common electrode strips 211 in the Y direction to the size of the pixel group 2120 in the Y direction is 50%. When the orthogonal projection of the space between the two first common electrode strips 211 on the base substrate 100 completely overlaps with the orthogonal projection of the first shading portion 300 on the base substrate, a ratio of the size of the first shading portion 300 in the Y direction equivalent to the size of the pixel group 2120 in the Y direction is 50%, and the present embodiment includes but is not limited thereto.

Figure 1B:
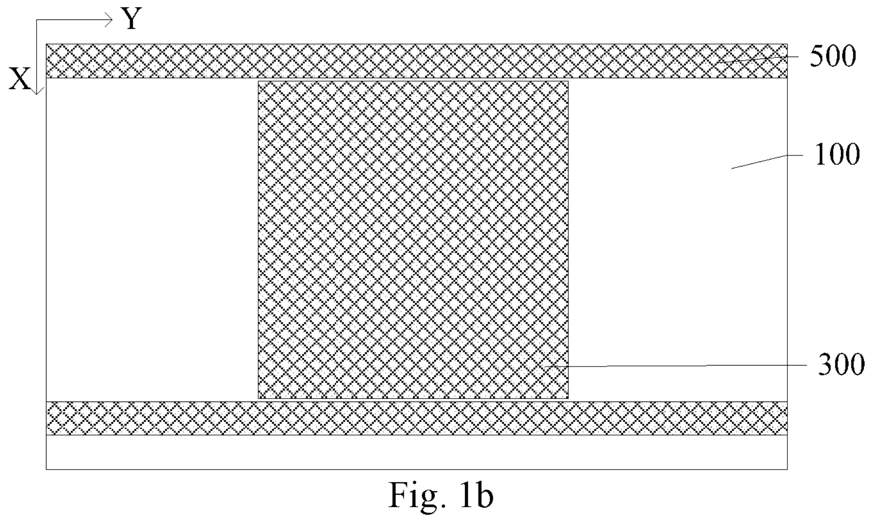
FIG. 1*b* is a structure view of partial layers of the display substrate illustrated by FIG. 1*a;*
Figure 7:
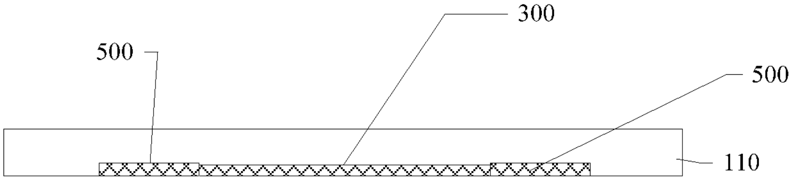

For example, FIG. 1*b* is a structure view of partial layers of the display substrate illustrated in FIG. 1*a*, as illustrated in FIG. 1*b*, the display substrate provided by the present embodiment further includes a gate line 500, the gate line 500 extends in the Y direction, and the gate line 500 is located on the same layer as the first shading portion 300, as illustrated in FIG. 7.

For example, the first shading portion 300 can be a common electrode line located on the same layer as the gate line 500, the common electrode line (the first shading portion 300) provided by the present disclosure has a wider width to achieve a shading effect. The first shading portion made from the common electrode line can be electrically connected to the common electrode through a through hole, and the present embodiment includes but is not limited thereto.

Figure 1C:
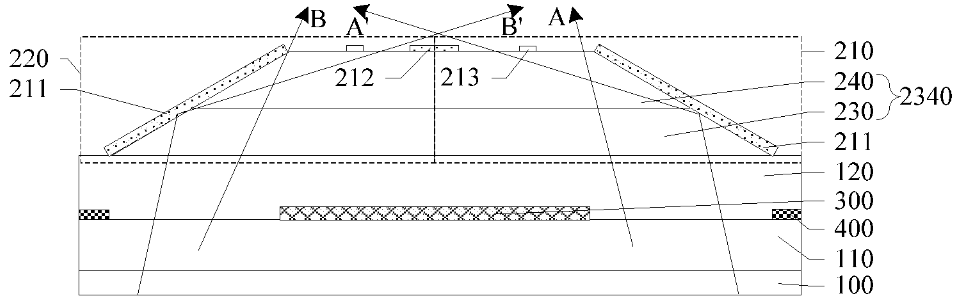
FIG. 1*c* is a sectional view of a display substrate provided by an embodiment of the present disclosure.

For example, FIG. 1*c* illustrates a sectional view of a display substrate provided by another example of the present embodiment, as illustrated in FIG. 1*c*, the display substrate further includes a data line 400, the data line 400 extends along the first direction, and there is a space between the data line 400 and the first shading portion 300 in the Y direction, so that the light incident from the side of the base substrate 100 facing away from the first shading portion 300 can be emitted to the pixel group from the space between the data line 400 and the first shading portion 300. In the direction perpendicular to the base substrate 100, an edge of the data line 400 close to the first shading portion 300 is aligned with an edge of the first common electrode strips 211 away from the second common electrode strip 212 or the data line 400 overlaps with the first common electrode strips 211, so that the light incident from the side of the base substrate 100 facing away from the first shading portion 300 cannot be emitted from the display substrate in the direction perpendicular to the base substrate 100.

For example as illustrated in FIG. 1*c*, the first shading portion 300 can be located on the same layer as the data line 400.

Figure 1D:
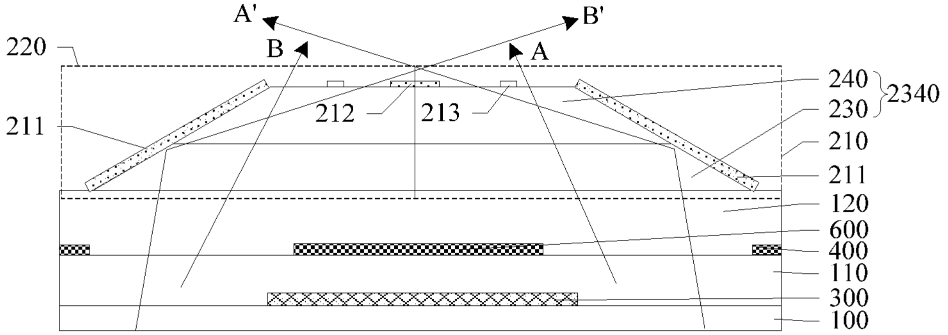
FIG. 1*d* is a sectional view of a display substrate provided by an embodiment of the present disclosure.

For example, FIG. 1*d* illustrates a sectional view of a display substrate provided by another example of the present embodiment. As illustrated in FIG. 1*d*, the first shading portion 300 is located on the same layer as the gate line. The display substrate further includes a second shading portion 600, the second shading portion 600 is disposed on the same layer as the data line 400, and an orthogonal projection of the second shading portion 600 on the base substrate 100 falls within the orthogonal projection of the first shading portion 300 on the base substrate 100, that is, the second shading portions 600 extends in the first direction, and a size of the second shading portion 600 in the Y direction is not greater than the size Ls of the first shading portion 300 in the Y direction. The second shading portion provided by the present disclosure is configured to achieve a further shading function to prevent the light incident on the color filter layer corresponding to the first (second) pixel unit from being emitted from the second (first) pixel unit to cause a crosstalk phenomenon.

For example, the second shading portion 600 can also be the common electrode line disposed on the same layer as a source electrode and a drain electrode, the common electrode line (the second shading portion 600) provided by the present disclosure has a wider width to achieve a shading effect. The second shading portion made from the common electrode line can be electrically connected to the first shading potion through a through hole to reduce resistance of the entire common electrode line.

For example, as illustrated in FIG. 1*a* to 1*d*, the two pixel units 210 and 220 of each pixel group 2120 are symmetrically distributed along a centerline of the first direction with respect to the second common electrode 212.

In the display substrate according to the embodiments of the present embodiment, the pixel electrodes in the two pixel units of each pixel group can be independently controlled so that different voltages can be applied to different pixel units so that the two pixel units respectively display left-eye and right-eye images.

Second Embodiment

Figure 2:
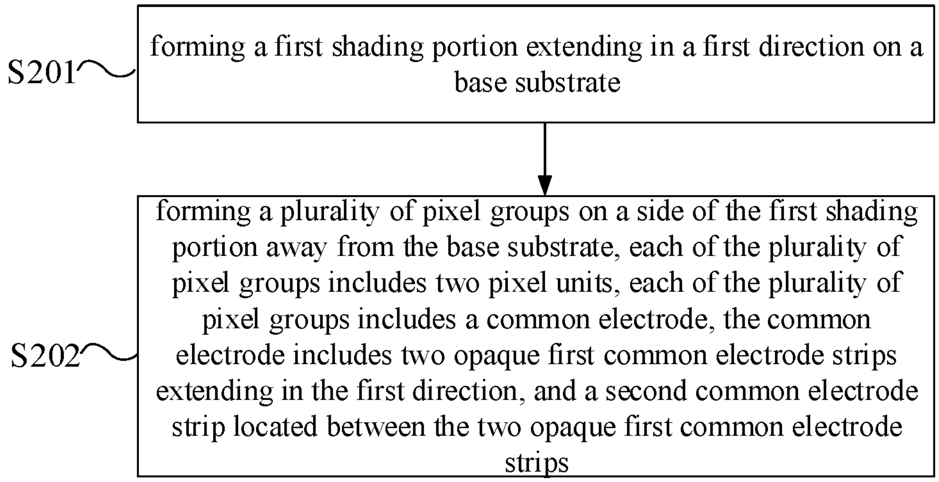
FIG. 2 is a view of steps of a manufacturing method of a display substrate provided by an embodiment of the present disclosure.

The present embodiment provides a manufacturing method of a display substrate, and specific steps of the manufacturing method of the display substrate are illustrated in FIG. 2, which include the following steps.

S201: forming a first shading portion extending in a first direction on a base substrate.

FIG. 3*a* to FIG. 6*b* are diagrams illustrating a process for the display substrate provided by the present embodiment, and the process for the display substrate provided by the present embodiment is described by taking an example of the finally formed display substrate illustrated in FIG. 1*d*.

Figure 3A:
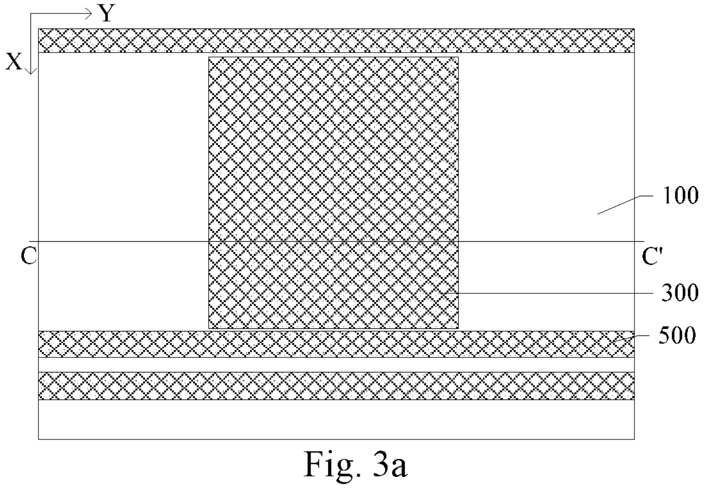
FIG. 3*a* to FIG. 6*b* are diagrams illustrating a process for a display substrate provided by an embodiment of the present disclosure and FIG. 7 is a sectional view of d display substrate provided by embodiment of the present disclosure.

For example, FIG. 3*a* is a top view of the display substrate, as illustrated in FIG. 3*a*, a gate line 500 and a gate electrode are formed on the base substrate 100 by film formation, exposure, etching and other processes, and then the first shading portion 300 extending in the first direction is formed on the layer on which the gate electrode is located, the first direction herein refers to X direction.

Figure 3B:
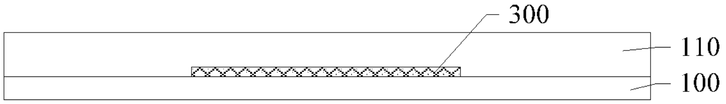

For example, FIG. 3*b* is a sectional view in the C-C' direction in FIG. 3*a*, a gate insulating layer 110 is formed on the first shading portion 300 after forming the first shading portion 300. In order to illustrate a top view of the display substrate clearly, FIG. 3*a* does not illustrate the gate insulating layer 110. FIG. 3*a* and FIG. 3*b* illustrate a case that one first shading portion 300 is formed on the base substrate 100 is only exemplified, and a plurality of first shading portions 300 can be formed on the base substrate 100.

For example, the first shading portion 300 can be a common electrode line on the same layer as the gate line, and the formed common electrode line (the first shading portion 300) in the present embodiment has a wider width to achieve a shading effect.

Figure 4A:
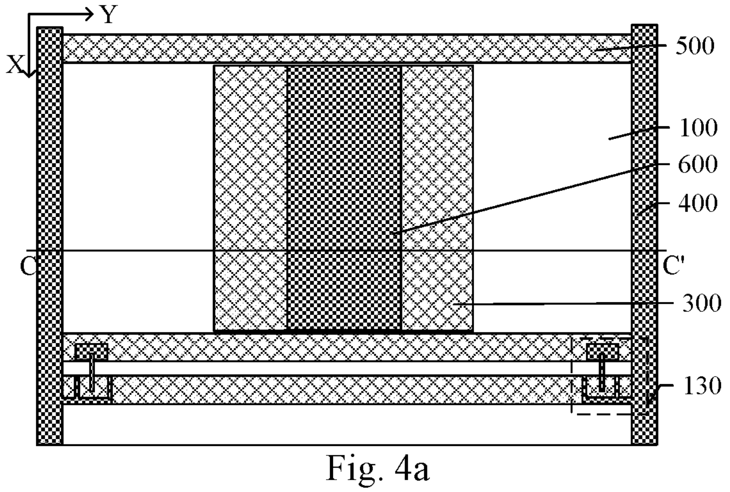

For example, FIG. 4*a* is a top view of the display substrate, as illustrated in FIG. 4*a*, after the first shading portion 300 is formed, a source-drain electrode pattern in a thin film transistor 130, a data line 400 and a second shading portion 600 are formed on the gate insulation layer 110 by a film formation, exposure, and etching process. The formed data line 400 on the base substrate 100 extends in the X direction, and there is a space between the data line 400 and first shading portion 300 in a second direction perpendicular to the X direction, that is the Y direction.

For example, an orthogonal projection of the second shading portion 600 on the base substrate 100 falls within the orthogonal projection of the first shading portion 300 on the base substrate 100, that is, the second shading portion 600 extends in the X direction, and a size of the second shading portion 600 in the Y direction is not greater than a size of the first shading portion 300 in the Y direction. The second shading portion 600 provided by the present embodiment is further configured to achieve the shading effect.

For example, the second shading portion 600 can also be the common electrode line disposed on the same layer as a source electrode and a drain electrode, the formed common electrode line (the second shading portion 600) provided by the present disclosure has a wider width to further achieve the shading effect. The second shading portion made from the common electrode line can be electrically connected to the first shading portion through a through hole to reduce resistance of the entire common electrode line.

Figure 4B:
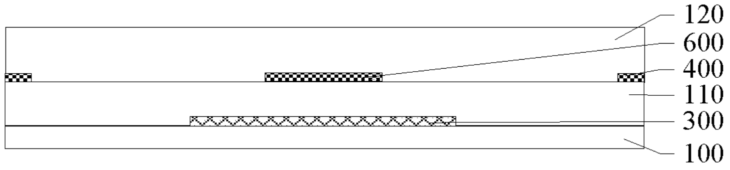

For example, FIG. 4*b* is a sectional view in the C-C' direction in FIG. 4*a*, and a passivation layer 120 is formed on the second shading portion 600 after forming the second shading portion 600. In order to illustrate a top view of the display substrate clearly, FIG. 4*a* does not illustrate the passivation layer 120.

S202: forming a plurality of pixel groups on a side of the first shading portion away from the base substrate, each of the plurality of pixel groups includes two pixel units, each of the plurality of pixel groups includes a common electrode, the common electrode includes two opaque first common electrode strips extending in the first direction, and a second common electrode strip located between the two opaque first common electrode strips.

Figure 5A:
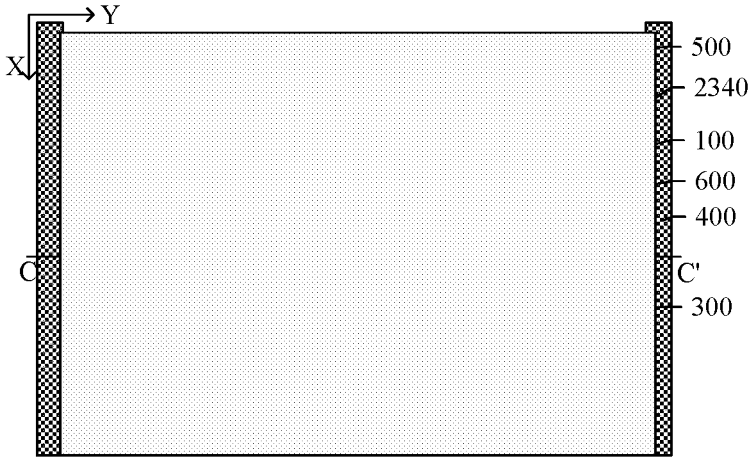
Figure 5B:
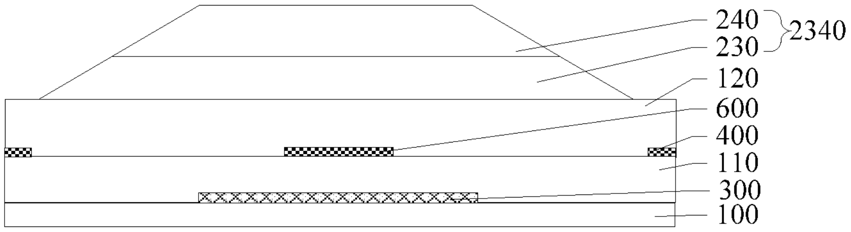

For example, as illustrated in FIG. 5*a* and FIG. 5*b*, forming each of the pixel groups in the preset embodiment includes forming an interlayer dielectric layer 2340 and a metal connection hole etc. on the passivation layer 120. For example, the interlayer dielectric layer 2340 includes a color filter film 230 (non-resin material) and a resin layer 240. For example, a sectional shape of the patterned interlayer dielectric layer 2340 is a trapezium, the present embodiment takes an example that the sectional shapes of the color filter layer 230 and the resin layer 240 are both trapeziums as an example for description, and the present embodiment includes but is not limited thereto. For example, the interlayer dielectric layer can further include other layers.

For example, FIG. 5*b* is a sectional view in the C-C' direction in FIG. 5*a*, and the resin layer 240 is formed on the color filter layer 230 after forming the color filter layer 230. In order to illustrate a top view of the display substrate clearly, FIG. 5*a* schematically illustrates the interlayer dielectric layer 2340.

Figure 6A:
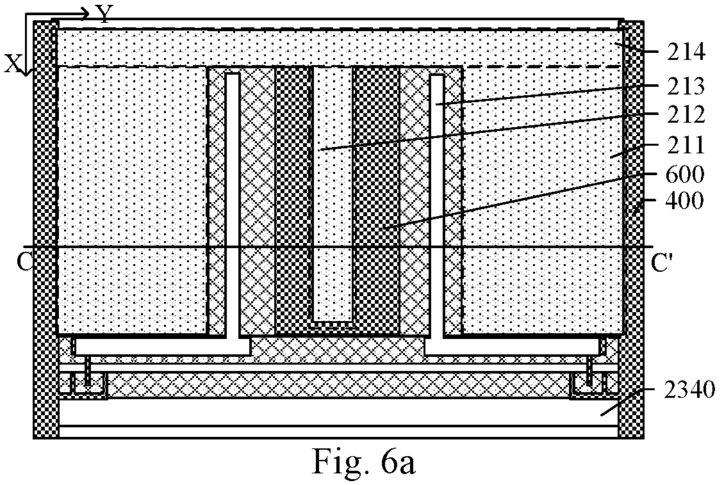

For example, as illustrated in FIG. 6*a*, the method of forming each of the pixel groups on the present embodiment includes forming two pixel units 210 and 220, each of the pixel groups consisting of the pixel units 210 and 220 includes a common electrode, the common electrode includes two opaque first common electric strips 211 and a second common electrode strip 212 located between the two opaque first common electrode strips 211 which extend in the X direction and are arranged in the Y direction, and the first common electrode strips 211 and the second common electrode strip 212 are electrically connected with each other through a connection portion 214. It should be noted that, the two pixel units 210 and 220 here have one first common electrode strip 211 respectively and share one second common electrode strip 212. The two opaque first common electrode strips 211 play a role of shading.

Figure 6B:
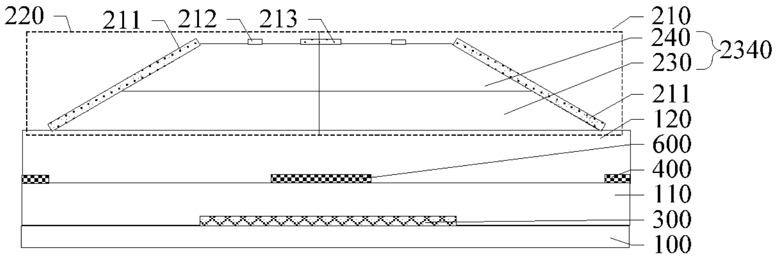

For example, FIG. 6*b* is a sectional view in the C-C' direction in FIG. 6*a*, a case of forming a pixel group on the base substrate 100 in FIG. 6*a* and FIG. 6*b* is only exemplified, and a plurality of pixel groups can be formed in the base substrate 100.

For example, the two opaque first common electrode strips 211 are respectively formed on two waists of the trapezium so as to achieve the inclination design, that is, in a direction from the edge of the first common electrode strips 211 close to the second common electrode strip 212 to the edge of the first common electrode strips 211 away from the second common electrode strip 212, a vertical distance from the first common electrode strips 211 to the base substrate 100 gradually decreases, that is, a plane where the first common electrode strips 211 is located has an inclination angle with respect to a plane where the base substrate 100 is located, and the present embodiment includes but is not limited thereto.

For example, sectional shapes of the interlayer dielectric layer 2340 are both isosceles trapeziums, and then an inclination angle (acute angle) between a plane where a first common electrode strip 211 in the first pixel unit 210 is located and the plane where the base substrate 100 is located is the same as an inclination angle (acute angle) between a plane where a first common electrode strip 211 in the second pixel unit 220 is located and the plane where the base substrate 100 is located, and the present embodiment includes but is not limited thereto.

For example, a side of the first common electrode strips 211 facing the base substrate 100 is a reflective surface, emergent light incident from the right side of the first shading portion 300 in the Y direction is reflected by the first common electrode strip 211 in the first pixel unit 210 and emits to the left (right) eye of the user, and emergent light incident from the left side of the first shading portion 300 in the Y direction is reflected by the first common electrode strip 211 in the second pixel unit 220 and emits to the right (left) eye of the user. Because the first common electrode strips 211 play a role of reflection, more light can be reflected by the first common electrode strips 211 and be emitted from the pixel group to increase the transmittance of the display substrate. On the other hand, the inclination design of the first common electrode strips 221 can also increase the viewing angle of the display substrate. The design structure of the display substrate provided by the present embodiment can be compatible with a general TFT-LCD to achieve the naked-eye 3D display and a purpose of reducing the cost of transforming the TFT-LCD production line on the basis of the TET-LCD.

For example, the sectional shape of the patterned interlayer dielectric layer 2340 can be not a trapezium, that is, the first common electrode strips 211 are not limited to the inclination design, as long as the light incident from the side of the base substrate 100 facing away from the first shading portion 300 cannot be emitted from the display substrate in the direction perpendicular to the base substrate 100.

For example, the second common electrode strip 212 can be made of the same opaque conductive material as the first common electrode strips 211 so as to limit the emergent light path, and the present embodiment includes and is not limited thereto.

For example, as illustrated in FIG. 6*a* and FIG. 6*b*, an orthogonal projection of the space between the two opaque first common electrode strips 211 on the base substrate 100 falls within the orthogonal projection of the first shading portion 300 on the base substrate 100, that is, in a direction perpendicular to the base substrate 100, an edge of the first common electrode strips 211 close to the second common electrode strip 212 can be aligned with an edge of the first shading portion 300 close to the first common electrode strips 211, or the first common electrode strips 211 overlap with the first shading portion 300. For example, a size of an overlap in the Y direction is less than 2 μm, and the present embodiment includes but is not limited thereto. The light incident from the side of the base substrate 100 facing away from the first shading portion 300 cannot be emitted from the display substrate in the direction perpendicular to the base substrate 100, that is, the first common electrode strips 211 provided by the present embodiment have a wider width, and the first common electrode strips 211 can cooperate with the first shading portion 300 to form a barrier, so that the light can only be emitted in a fixed direction under the function of the barrier, so as to achieve the purpose of controlling the light path.

For example, the light for the left-eye image displayed by the pixel groups is transmitted to the left eye of the user, and the light for the right-eye image displayed by the pixel groups is transmitted to the right eye of the user through a combined influence of the first common electrode strips 211 and the first shading portion 300.

For example, there is a space between the data line 400 and the first shading portion 300 in the Y direction, so that the light incident from the side of the base substrate 100 facing away from the first shading portion 300 can be emitted to the pixel groups from the space between the data line 400 and the first shading portion 300. In the direction perpendicular to the base substrate 100, an edge of the data line 400 close to the first shading portion 300 is aligned with an edge of the first common electrode strips 211 away from the second common electrode strip 212 or the data line 400 overlaps with the first common electrode strips 211, so that the light incident from the side of the base substrate 100 facing away from the first shading portion 300 cannot be emitted from the display substrate in the direction perpendicular to the base substrate 100.

For example, forming the pixel groups further includes: forming pixel electrodes 213 on the same layer as the common electrode, wherein the pixel electrodes 213 are formed between the first common electrode strips 211 and the second common electrode strip 212 respectively. It should be noted that, the display substrate provided by the present embodiment is an in-plane switching (IPS) display mode, for example, the display mode can be an advanced-super dimensional switching (ADS) mode, a fringe field switching (FFS) mode and so on.

For example, the material of the pixel electrodes can be the same as that of the common electrode, so that the pixel electrodes and the common electrode can be made in one patterning process so as to save the process.

Third Embodiment

The present embodiment provides a display device, the display device includes any display substrate provided by the first embodiment, in the display device, the light for the left-eye image displayed by the pixel groups is transmitted to the left eye of the user, and the light for the right-eye image displayed by the pixel groups is transmitted to the right eye of the user through a combined influence of the first common electrode strips and the first shading portion so as to achieve the naked-eye 3D display effect.

For example, the display device can be a liquid crystal display device and any product or component having a display function, such as a television, a digital camera, a mobile phone, a watch, a tablet computer, a notebook computer, a navigator, and the like including the display device, but the present embodiment is not limited thereto.

For example, the abovementioned liquid crystal display device further includes an opposing substrate disposed oppositely to the display substrate, the display substrate and the opposing substrate are cell-assembled to form a liquid crystal cell, and a liquid crystal layer is located between the display substrate and the opposing substrate.

The following points should to be explained:

(1) Unless otherwise defined, the same reference numerals in at least one embodiment and the drawings of the present disclosure represent the same meaning.

(2) The accompanying drawings involve only the structure(s) in connection with the embodiment(s) of the present disclosure, and other structure(s) can be referred to normal design(s).

(3) For the purpose of clarity, in accompanying drawings for illustrating the embodiment(s) of the present disclosure, a layer or an area may be enlarged. It should understood that, in the case in which a component or element such as a layer, film, area, substrate or the like is referred to be "on" or "under" another component or element, it may be "directly" "on" or "under" the another component or element, or a component or element can be interposed therebetween.

The foregoing is only the embodiments of the present disclosure and not intended to limit the scope of protection of the present disclosure. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A display substrate, comprising:

a base substrate;

a plurality of pixel groups, located on the base substrate, wherein each of the pixel groups comprises two pixel units, each of the pixel groups comprises a common electrode, the common electrode comprises two opaque first common electrode strips extending in a first direction, and a second common electrode strip located between the two opaque first common electrode strips;

a first shading portion, located between the plurality of pixel groups and the base substrate, the first shading portion extends in the first direction, wherein an orthogonal projection of a space between the two opaque first common electrode strips on the base substrate entirely falls within an orthogonal projection of the first shading portion on the base substrate.

2. The display substrate according to claim 1, wherein in a direction from close to the second common electrode strip to away from the second common electrode strip, a vertical distance from the two opaque first common electrode strips to the base substrate gradually decreases, and a side of the two opaque first common electrode strips facing the base substrate is a reflective surface.

3. The display substrate according to claim 1, wherein the plurality of pixel groups comprise:

an interlayer dielectric layer, located on the first shading portion, a section of the interlayer dielectric layer is a trapezoid, the two opaque first common electrode strips are respectively located on two waists of the trapezoid.

4. The display substrate according to claim 3, wherein the interlayer dielectric layer comprises a color filter layer.

5. The display substrate according to claim 1, wherein a ratio of a sum of sizes of the two opaque first common electrode strips in a second direction perpendicular to the first direction to a size of the plurality of pixel groups in the second direction is in a range of 40% to 60%, and the second direction is parallel to the base substrate.

6. The display substrate according to claim 1, further comprising:

a data line, extending in the first direction, and there is a space between the data line and the first shading portion in a second direction perpendicular to the first direction, wherein in a direction perpendicular to the base substrate, an edge of the data line close to the first shading portion is aligned with an edge of the two opaque first common electrode strips away from the second common electrode strip or the data line overlaps with the two opaque first common electrode strips, the second direction is parallel to the base substrate.

7. The display substrate according to claim 6, wherein the first shading portion is on a same layer as the data line.

8. The display substrate according to claim 6, further comprising:

a gate line extending in the second direction, and the first shading portion is on a same layer as the gate line.

9. The display substrate according to claim 8, further comprising:

a second shading portion, disposed on a same layer as the data line, and an orthogonal projection of the second shading portion on the base substrate falls within the orthogonal projection of the first shading portion on the base substrate.

10. The display substrate according to claim 9, wherein a material of the first shading portion and a material of the second shading portion comprise a conductive material, and the first shading portion is electrically connected to the second shading portion, the first shading portion is electrically connected to the common electrode.

11. The display substrate according to claim 1, wherein each of the pixel groups further comprises a pixel electrode disposed in a same layer as the common electrode, the pixel electrode is located between the two opaque first common electrode strips and the second common electrode strip.

12. The display substrate according to claim 1, wherein the two pixel units of each of the pixel groups are symmetrically distributed with respect to a centerline of the second common electrode along the first direction.

13. A manufacturing method of a display substrate, comprising:

forming a first shading portion extending in a first direction on a base substrate;

forming a plurality of pixel groups on a side of the first shading portion away from the base substrate, each of the pixel groups comprises two pixel units, each of the pixel groups comprises a common electrode, the common electrode comprises two opaque first common electrode strips extending in the first direction, and a second common electrode strip located between the two opaque first common electrode strips, wherein an orthogonal projection of a space between the two opaque first common electrode strips on the base substrate entirely falls within an orthogonal projection of the first shading portion on the base substrate.

14. The manufacturing method of the display substrate according to claim 13, wherein forming the plurality of pixel groups comprises:

forming an interlayer dielectric layer with a sectional shape of trapezoid on the first shading portion, wherein the two opaque first common electrode strips are respectively formed on two waists of the trapezoid.

15. The manufacturing method of the display substrate according to claim 13, further comprising:

forming a second shading portion on the first shading portion so that an orthogonal projection of the second shading portion on the base substrate falls within the orthogonal projection of the first shading portion on the base substrate.

16. A display device, comprising the display substrate according to claim 1.

* * * * *